UNITED STATES PATENT OFFICE.

EDWARD D. KENDALL, OF ELIZABETH, NEW JERSEY, ASSIGNOR OF ONE-HALF TO HAGGIN ESTATE, INC., A CORPORATION OF NEW YORK.

COMPOSITION OF MATTER FOR USE IN THE WELDING OF STEELS AND IRON.

1,338,736.  Specification of Letters Patent.  Patented May 4, 1920.

No Drawing.  Application filed April 9, 1919. Serial No. 288,851.

*To all whom it may concern:*

Be it known that I, EDWARD D. KENDALL, a citizen of the United States, residing at Elizabeth, in the county of Union and State of New Jersey, have invented a new and useful Composition of Matter for Use in the Welding of Steels and Iron, of which the following is a specification.

The object of my invention is the production of a compound that shall facilitate the welding of steels and iron, particularly in operations at the forge, and that shall be efficient, cheap, unchangeable in chemical character by exposure to the air and inodorous when in use.

My composition consists of diatomite (infusorial earth) combined with a small proportion of a metal that is chemically electro-positive to iron and with a small proportion of a flux that is easily fusible and chemically inactive under the specified use, all constituents thoroughly incorporated; this compound to be used in any practicable way, but preferably after preliminary heating and removal of any iron oxid scale from the surfaces of the steels or iron to be welded.

In preparing my welding compound I reduce to powder, or its natural state of comminution, a selected grade of diatomite, after thoroughly drying the same in a current of hot air or otherwise; I add to this a small proportion of zinc-dust (produced as a by-product in the distillation of metallic zinc from its ores) and also a small proportionate quantity of powdered calcium fluorid. I do not confine myself to exact relative proportions of these ingredients, as the proportions may be varied within wide limits and still produce a more or less effective welding compound, but I prefer to use with say ten pounds of the prepared diatomite one pound of zinc-dust and one pound of calcium fluorid, thoroughly incorporating all constituents, as by repeated siftings.

This welding compound applied to surfaces of steel or iron at or near welding heat prevents the formation of iron oxid or if this is formed reduces it to metallic iron and at the same time gives all the fluxing required; no harm accrues from using an excessive quantity.

This composition is not hygroscopic, it may be kept in open container.

I claim:

1. A welding compound, to be used in the welding of steels and iron, consisting of diatomite combined with a proportionately small quantity of a comminuted metal that is chemically electro-positive to iron and combined also with a relatively small quantity of calcium fluorid.

2. A welding compound, to be used in the welding of steels and iron, consisting of diatomite with about ten per cent. of its weight of zinc-dust, more or less, and about ten per cent. of its weight of comminuted calcium fluorid, more or less, substantially as herein described.

EDWARD D. KENDALL.